United States Patent [19]

Fiorini

[11] Patent Number: 4,487,451
[45] Date of Patent: Dec. 11, 1984

[54] SLEEPER SEAT

[76] Inventor: Paul J. Fiorini, 142 Oakwood Ave., Bogota, N.J. 07603

[21] Appl. No.: 351,780

[22] Filed: Feb. 24, 1982

[51] Int. Cl.³ .................. A47C 17/16; A47C 27/00; B60N 1/10
[52] U.S. Cl. ........................... 297/219; 5/38; 5/413; 297/63; 297/354
[58] Field of Search ............ 297/354, 63, 64, 67, 297/218, 219, 261; 5/413, 37 R, 38, 47; 296/69

[56] References Cited

U.S. PATENT DOCUMENTS

| | | | |
|---|---|---|---|
| 1,608,064 | 11/1926 | Henry | 297/63 X |
| 2,654,099 | 10/1953 | Ake et al. | 297/354 X |
| 2,797,742 | 7/1957 | Cleary | 297/219 X |
| 4,248,479 | 2/1981 | Toda | 297/342 X |
| 4,352,524 | 10/1982 | Crosby | 297/218 X |

FOREIGN PATENT DOCUMENTS 415167 8/1934 United Kingdom .................. 297/63

Primary Examiner—William E. Lyddane
Assistant Examiner—Peter Brown
Attorney, Agent, or Firm—Richard T. Laughlin

[57] ABSTRACT

A vehicle seat especially adapted for use in a camper, pick-up truck or the like which has a seat back which can be fully reclined to the horizontal position. The seat includes a sleeping compartment arrangement which is attached to the seat for use as a bed cover when in a horizontal position. The base of the seat back includes leg members, which allow level placement of the seat back in the horizontal position. When in use as a conventional car seat, a belt or strap secures the sleeping compartment to the seat. The seat is designed for removal from the vehicle, for use as a bed in a tent, cabin or other area.

9 Claims, 6 Drawing Figures

SLEEPER SEAT

BACKGROUND OF THE INVENTION

Sleeping and storage attachments for various vehicles are known in the prior art. Further, reclining seats for various vehicles have been long known in the prior art. Seats of these types have seat backs which can be reclined to a variety of angles to permit support for the seated passengers or drivers. Few of these seats allow for reclining as far as the horizontal position. Further, few if any of the reclining seats are suitable for use in the reclined position for long periods of time let alone for extended sleep.

While beds for camper vans and the like are also known in the art, few of these beds can also be used as conventional seats for passengers or drivers. Those that can be converted from a bed to a seat are difficult to assemble and require a large number of parts and components such as braces or fasteners. These seats/beds while providing comfort in the seated position are often uncomfortable in the reclined position or vice versa. In order to provide secure position for driving safety, these seats are not easily adjustable and rarely removable.

A need exists for a more compact, economical and versatile bed or kit for converting a portion of the interior of a truck or automobile into a sleeping quarters for campers and the like. Such an apparatus must be economical, easy to assemble, and disassemble quickly, substantially without any tools. In general, the prior art devices have suffered from complex and difficult assembly and disassembly problems, requiring fairly large numbers of fasteners, and an excess number of parts or components. Further, they have required substantial storage areas when not in use.

SUMMARY OF THE INVENTION

It is the object of the invention to provide a vehicle seat which can be completely reclined to the horizontal position and provide a comfortable bed. It is another object of the invention to provide a reclining seat which includes a sleeping compartment for use as a bed. A further object of the invention is to provide a reclining seat which can be easily and securely reclined and which can be removed for use apart from the vehicle. These and other objects and the advantages of the invention will be apparent from the following description.

The purpose of this invention is to eliminate the deficiencies of the prior art, through the provision of a sleeping bag assembly for campers, which is entirely practical, very easy to install and remove, inexpensive, and substantially free from the numerous screws and fasterners and the like found in the prior art devices. While the invention is intended particularly for a pick-up truck or the like, it is in no sense restricted to this use, and with very slight modifications could be installed in almost any type of automobile or truck.

In accordance with the invention, a reclining seat is provided which can be fully reclined to the horizontal position. The seat will be locked in the upright position by a latch at the side of the seat, which can readily be released to place the seat back in a horizontal configuration. Legs or similar supports located on the back of the seat back provide level support for the seat in such reclined position.

The seat includes, integrally attached, a sleeping bag or other blanket arrangement which covers the seat cushion and seat back. The sleeping bag has, at one end, an opening similar to that of a conventional sleeping bag for the user to enter. The outside of the sleeping bag can include a series of belt loops which are engaged by a belt or strap which secures the bag to the seat when the seat is being used in the upright position for driving. The novelty of the invention resides in the combination of units which serve both as a seat and a bed.

DETAILED DESCRIPTION OF THE INVENTION

Figure 1:
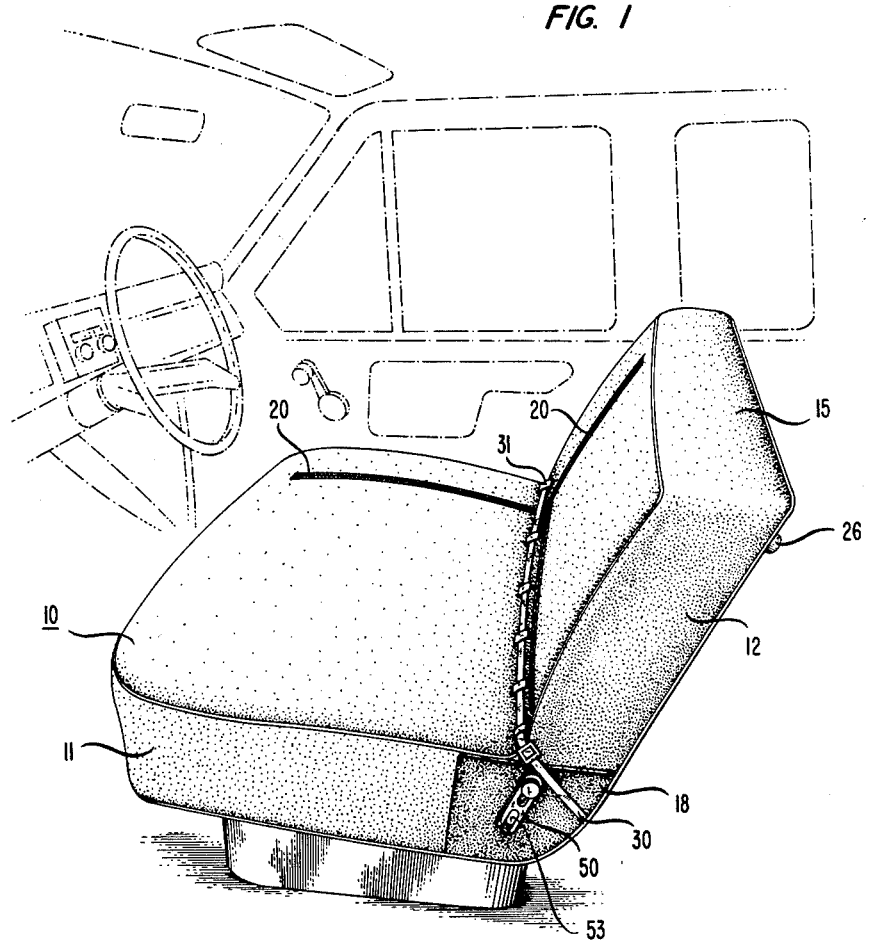
FIG. 1 is a perspective view of the invention with the seat back in an upright, driving position.
Figure 2:
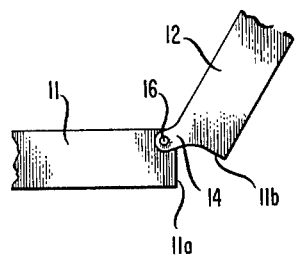
FIG. 2 is a perspective view of the hinge arrangement securing the base and back portion together with the decorative side panel removed.
Figure 3:
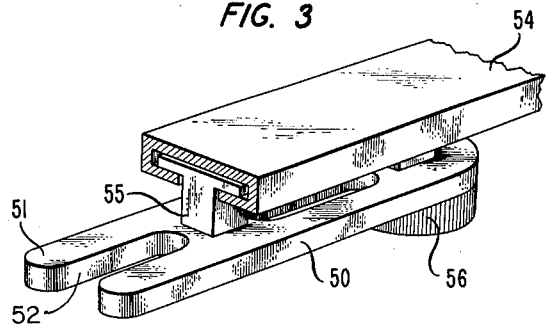
FIG. 3 is an enlarged view showing the slideable securing latch and support arrangements.

Referring to the drawings, the specially designed seat of the invention is generally indicated at 10. The seat has a base section 11 and a back section 12. The seat is designed to allow the back of the seat to fold downward to form a horizontal surface with the base without any depressions in the area where the front and back of the seat join, in order to insure the maximum degree of comfort when being utilized as a bed. This is accomplished by shaping the base and back of the seat to allow a smooth contour when folded into a horizontal position as shown in FIG. 2. In this illustration, it is accomplished by having the back and seat with angular edges 11(a) and 11(b) along their junction. The back 12 and the seat 11 are hinged together through a flange 14 on the back. This flange 14 at each end of the seat is connected to the base by a pin 16 which secures the back 12 to the seat 11 but allows rotation of the back 12 in relation the the seat 11. A concealing and decorative panel 18 is affixed to the seat 11 to cover the pin 16 and ends of the seat and back. A releasable catch 50, as shown in FIGS. 1 and 3, is provided to allow the back 12 to be released from its upright position and lowered, so that it is in a horizontal plane with the seat 11. The releasable catch 50 comprises a body portion 51 with a slot 52 cut into one end of the body portion. The slot 52 is constructed to slideably engage with a projection or stop 53 which is secured to the side of the seat 11. The release catch slides on a rail 54 affixed to the side of the back 12. The underside of the releasable catch has a outwardly extending rail 55 which slides in the rail 54. A spring mechanism is provided for maintaining the catch in the closed position. The catch 51 also has a projection, or knob 56. By pulling the knob upwardly the plate and its associated slot 52 move out of contact with the stop 53 thereby releasing the seat from its upright position.

A sleeper seat cover 15 as shown in FIG. 1 is integrally attached to the seat 11 and back 12, as is well known upholstering practices. It is also contemplated that the sleeper seat cover can be a separate unit which can be attached by elastic strips, snaps or other well known methods, to the underside of a conventional bench type auto seat. The cover is utilized both when the seat is being used for driving the vehicle as well as for sleeping.

In the presently described embodiment, the sleeper seat cover extends from the lower edge of the seat portion to the back edge of the back portion. The sleeper seat cover can be uniformly secured along the lower/outer edge of the seat and back.

The sleeper seat cover is preferably formed of two ply material which can be similar to a sleeping bag construction either of synthetic fiber or natural material. The sleeper seat cover includes an intermeshing fastener such as the product sold under the registered trademark ZIPPER ®20 or other opening device extending longitudinally across one side of both the horizontal seat portion and vertical seat back. The present invention also can include a second fastener 21 or opening device extending perpendicularly from the longitudinal fastener 20, along the lower body portion of the vertical back 11.

Other features of the present invention can be the inclusion of a seat belt 30 or restraint that secures the sleeper seat cover to the seat. The belt 30 extends across the juncture of the horizontal seat portion and vertical seat back. The sleeping bag portion can be provided with a removable inner absorbent liner for ease of cleaning. In the preferred embodiment of the invention, the bag portion is filled with down or similar insulation material.

The belt 30 can be in the form of a conventionally buckling seat, belt having a side buckle 31, or the seat belt 30 can be the automatically retractable type with a reel on one side and a hold drum clip on the other. A plurality of spaced-apart belt loops 31 are included to secure the belt 30 in proper positions.

In operation, the seat 10 is moved forward on its conventional runners, used for adjusting the seat to the driver's convenience and locked in position. The upright portion of the seat is released by moving the back release knob 56 upward and allowing the back to fold or go into a horizontal position in relation to the face of the seat. For safety reasons, the knob can be on screw threads so that it can be tightened to lock the back and the base of the seat in its fixed position. The back of the seat rests on legs 26 and 27 secured to the top back edge of the seat back 12. The legs can be any type or projection or bar so that both the seat base and the back form a smooth, horizontal base for sleeping. The sleeping bag component can then be unzipped or otherwise opened to allow easy entry. As an alternate arrangement, the seat can be removed from the vehicle and placed on a flat section of the ground and the procedure described above followed to put it into condition for use as a sleeping bed.

Figure 5:
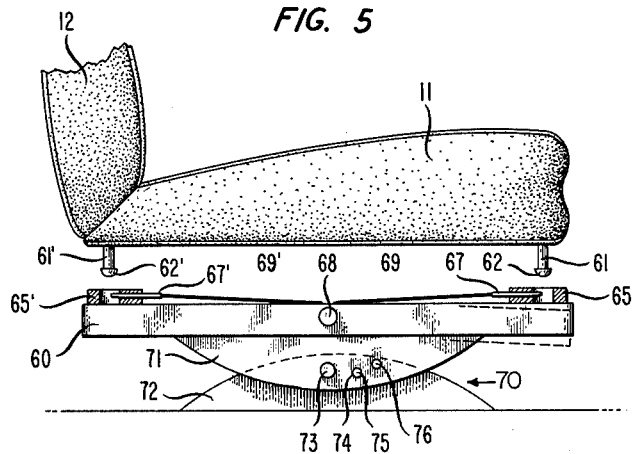
FIG. 5 is an alternate support for the seat.
Figure 6:
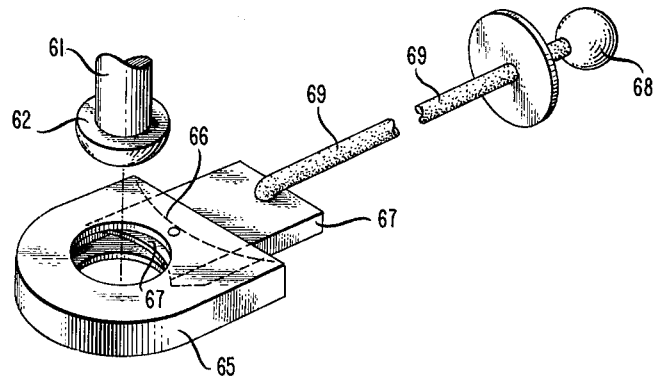
FIG. 6 is an enlarged view of the attaching and release mechanism for the support shown in FIG. 5.
Figure 4:
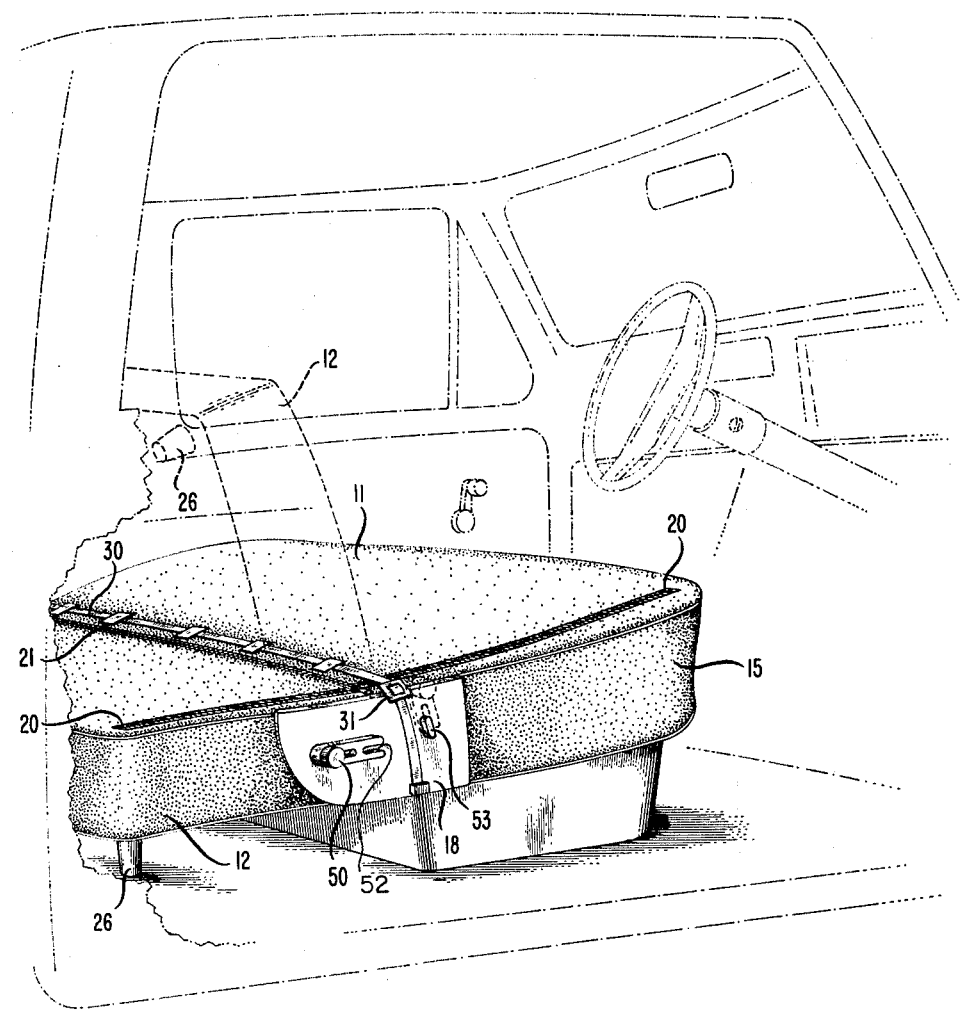
FIG. 4 is a perspective view of the invention with the seat in its folded position.

An alternate method of securing the seat to the motor vehicle is shown in FIGS. 5 and 6. In a conventional motor vehicle seat construction the leading edge of the seat is raised above the rear portion of the seat in order to have a confortable seating arrangement. When the back of the seat is folded down to form a bed arrangement according to this invention this raised leading edge can be overcome by providing a platform 60 on which the seat base 11 is secured. The seat is provided with four or more fastening means such as bolts 61, 61', for securing the seat 11 to the platform 60. Typical of such a fastening means is shown in FIG. 6 and comprises bolts secured to the bottom of the seat 11 and extending in a downward direction. The bolts are provided with flange tips 62 and 62' that fit into receiving receptacles 65,65'. The receptacle has a tension spring closure 66 for securing the flange tips in the receptacle. The closure consists of a metal plate 67 for closing against the bolt above the flange tip and preventing the removal of the tip from the receiving receptacle by restricting the passage. The closure is so connected that when the bolt and associated flange tip is pressed into the receiving receptacle the closure will be against the tension spring means and allow passage of the flange tip into the receiving receptacle. Once the flange tip is in the receiving receptacle it is locked in and can only be removed by moving the closure plate. The closure plate is moved by pulling on a knob 68 situated at the side of the seat which controls a wire 69 moving the closure platform 67. When the knob 68 is released the tension spring 66 causes the closure platform to move back into the closed position.

The platform is secured to the motor vehicle with rotating means generally indicated at 70. The rotating means can be in various forms and as shown in FIG. 5 it is two intersecting plates 71 and 72 at each side of the seat. One such plate 71 is secured to each end of the platform 60 and the corresponding second plate 72 to the motor vehicle frame. The two plates 71 and 72 are secured together to allow rotation of the seat by a pivoting means 73 such as an axle in suitable bearings at each end. A pin 74 provides for passing through a know 75 on each platform and securing the plates in a suitable position. When the pin is removed the seat can rotate with the leading edge of the seat moving downward to align a second set of holes 76 through the plates and the pin is reinstated. The second set of holes is aligned to hold the seat in position so that the seat is parallel to the motor vehicle frame. By this system the disadvantage of the raised leading edge of the seat is overcome.

While the invention has been described with reference to its preferred embodiment thereof, it will be appreciated by those of ordinary skill in the art that various changes can be made in the process and apparatus without departing from the basic spirit and scope of the invention.

What is claimed is:

1. In a seat unit for a vehicle comprising a base portion and an upright back portion slideably adjoined to the vehicle for allowing movement forward or backward in the horizontal plane, the improvement which comprises hinging means for connecting the base and the back portions along a common edge allowing the back portion to move from an upright position to a horizontal position so that the base and back portion form one horizontal unit presenting a smooth, united top, a bag portion covering the entire base and back portion having an opening to allow access to said bag portion, control means to allow release of the back portion from its upright position to its horizontal position, and wherein said bag portion is comprised of two insulated sheets of material lying in face-to-face relation with said opening in one of said insulated sheets to permit access therebetween.

2. The seat unit of claim 1 wherein said opening extends the width of said seat and is closed by means of an interlocking fastener.

3. The seat unit of claim 1 wherein said bag portion further comprises an inner absorbent liner.

4. The seat unit of claim 1 wherein fastening means are provided for securing the base to said seat.

5. The seat unit of claim 1 wherein said opening is provided with an interlocking fastener positioned at the intersection of said base portion and said upright back portion.

6. The seat unit of claim 1 wherein said back portion is provided with support means for maintaining the back portion in a horizontal position with said base portion.

7. The seat unit of claim 1 wherein said insulated sheets are down filled units.

8. The seat unit of claim 1 wherein said base portion is affixed to an adjustable platform for rotating the seat unit in the vertical plane.

9. The seat unit of claim 1 wherein said base portion is affixed to an adjustable platform for rotating the seat portion in the vertical plane and said adjustable platform is pivotally connected to the vehicle to allow rotation of the seat.

* * * * *

UNITED STATES PATENT AND TRADEMARK OFFICE
CERTIFICATE OF CORRECTION

PATENT NO. : 4,487,451
DATED : December 11, 1984
INVENTOR(S) : Paul J. Fiorini

It is certified that error appears in the above-identified patent and that said Letters Patent is hereby corrected as shown below:

Column 4, line 66, "base" should read --bag portion-- line 66, "seat" should read --unit--.

Signed and Sealed this

Thirtieth Day of April 1985

[SEAL]

Attest:

DONALD J. QUIGG

Attesting Officer

Acting Commissioner of Patents and Trademarks